United States Patent
Acinas Lope et al.

(10) Patent No.: US 10,122,248 B2
(45) Date of Patent: Nov. 6, 2018

(54) ELECTRIC DRIVE DEVICE

(71) Applicant: FAGOR, S. COOP, Arrasate-Mondragon (ES)

(72) Inventors: Francisco Javier Acinas Lope, Burgos (ES); Fernando Martinez Areal, Gondomar (ES); Javier Gomez De Segura Ipacua, Plentzia (ES); Jose Sanchez Luaces, Vigo (ES)

(73) Assignee: FAGOR, S. COOP, Arrasate-Mondragon (ES)

( * ) Notice: Subject to any disclaimer, the term of this patent is extended or adjusted under 35 U.S.C. 154(b) by 460 days.

(21) Appl. No.: 14/988,166

(22) Filed: Jan. 5, 2016

(65) Prior Publication Data

US 2016/0134178 A1 May 12, 2016

Related U.S. Application Data

(63) Continuation of application No. PCT/EP2014/064058, filed on Jul. 2, 2014.

(30) Foreign Application Priority Data

Jul. 8, 2013 (EP) .................................... 13382281

(51) Int. Cl.
*H02K 11/33* (2016.01)
*B62D 5/04* (2006.01)
(Continued)

(52) U.S. Cl.
CPC ........... *H02K 11/33* (2016.01); *B62D 5/0406* (2013.01); *H02K 5/225* (2013.01); *H02K 9/22* (2013.01)

(58) Field of Classification Search
CPC ........... H02K 11/33; H02K 5/225; H02K 9/22
(Continued)

(56) References Cited

U.S. PATENT DOCUMENTS 5,193,083 A * 3/1993 Yanagawa ............... G11B 7/126
369/116
5,782,652 A * 7/1998 Feher .................... H01R 4/2462
310/71
(Continued)

FOREIGN PATENT DOCUMENTS

DE 4410061 A1 9/1994
DE 102012102335 A1 11/2012
JP 2002345211 11/2002

OTHER PUBLICATIONS

International Search Report and the Written Opinion, PCT/EP2014/064058, dated Jul. 18, 2014, 14 pages.
(Continued)

*Primary Examiner* — Terrance Kenerly
(74) *Attorney, Agent, or Firm* — Edell, Shapiro & Finnan, LLC

(57) ABSTRACT

Electric drive device for an electric power steering system that includes an electric motor with a motor case, and a motor shaft with a drive end, an electronic control unit that controls the drive of the motor, According to one embodiment the electronic control unit includes a power board and a heat sink. A connector coupled to a side of the electric drive device is at least partially maintained in its position with the use of one or more projections projecting from a first area of the connector that reside within one or more corresponding housings located in a peripheral region of the heatsink.

18 Claims, 17 Drawing Sheets

(51) Int. Cl.
*H02K 5/22* (2006.01)
*H02K 9/22* (2006.01)

(58) Field of Classification Search
USPC .................................................... 310/64, 89
See application file for complete search history.

(56) References Cited

U.S. PATENT DOCUMENTS

| | | | |
|---|---|---|---|
| 6,577,030 B2 | 6/2003 | Tominaga et al. | |
| 8,646,568 B2* | 2/2014 | Yamasaki | B62D 5/0406 180/400 |
| 8,689,926 B2* | 4/2014 | Nagase | B62D 5/0406 180/443 |
| 8,753,141 B2* | 6/2014 | Randolph | H01R 4/185 439/398 |
| 8,866,357 B2* | 10/2014 | Yamasaki | H02K 5/225 310/68 R |
| 9,531,232 B2* | 12/2016 | Akutsu | B62D 5/0406 |
| 2003/0173920 A1 | 9/2003 | Tominaga et al. | |
| 2005/0006963 A1* | 1/2005 | Takenaka | B60K 1/00 310/52 |
| 2007/0157628 A1* | 7/2007 | Onoue | F25B 21/02 62/3.2 |
| 2011/0066332 A1 | 3/2011 | Sonada et al. | |
| 2011/0285225 A1* | 11/2011 | Matsuda | B62D 5/0406 310/64 |
| 2012/0098365 A1* | 4/2012 | Yamasaki | B62D 5/0406 310/71 |
| 2012/0229005 A1* | 9/2012 | Tominaga | B62D 5/0406 310/68 B |
| 2013/0088128 A1 | 4/2013 | Nakano et al. | |
| 2013/0119908 A1 | 5/2013 | Harada et al. | |
| 2013/0300222 A1* | 11/2013 | Nakano | H02K 11/0084 310/43 |
| 2013/0313929 A1* | 11/2013 | Naka | H02K 5/18 310/64 |
| 2014/0326530 A1* | 11/2014 | Asao | B62D 5/0406 180/443 |

OTHER PUBLICATIONS

European Search Report, EP 13382281, dated Apr. 25, 2014, 14 pages.

* cited by examiner

ELECTRIC DRIVE DEVICE

CROSS-REFERENCE TO RELATED APPLICATIONS

This application relates to and claims the benefit and priority to International Application No. PCT/EP2014/064058, filed Jul. 2, 2014, which claims the benefit and priority to European Application No. 13382281.7, filed Jul. 8, 2013.

TECHNICAL FIELD

The present invention is related to an electric drive device for an electric power steering system of automotive vehicles.

BACKGROUND

Electric power steering (EPS) systems of automotive vehicles, which assist in moving the steering wheel of automotive vehicles, are known in the state of the art. The assistance in moving the steering wheel consists of the EPS system delivering mechanical torque to the steering column of the automotive vehicle. In order to be able to generate the delivery torque, the EPS system comprises an electric drive device, said device comprising an electric motor generating mechanical torque. The electric motor is usually a three-phase alternating current (AC) motor, but the electric drive device is powered with direct current DC from the vehicle, so it is necessary to convert said direct current into three-phase alternating current, and it is furthermore necessary to control the drive of the electric motor, so the electric drive device needs an electronic control unit close to the electric motor.

EP2549627 A1 discloses an electric drive device for an EPS system, comprising an electric motor with a motor case, a stator arranged inside the motor case providing a plurality of phases, a rotor arranged rotatably in relation to the stator, and a motor shaft that rotates together with the rotor with a drive end of the output torque of the motor projecting from the motor case. The device also comprises an electronic control unit, after the motor, controlling the drive of the motor, comprising a power board supplying current to the motor, and a control board electrically connected to the power board controlling the drive of the motor through the power board, and a heat sink absorbing and dissipating the heat generated by the power board. The heat sink, the power board and the control board are arranged after the motor in the mentioned order.

SUMMARY OF THE DISCLOSURE

According to one implementation an electric drive device is provided that comprises an electric motor with a motor case, a stator arranged inside the motor case providing a plurality of phases, a rotor arranged rotatably in relation to the stator, and a motor shaft that rotates together with the rotor with a drive end of the output torque of the motor projecting from the motor case. The device also comprises an electronic control unit controlling the drive of the motor, the electronic control unit comprising a power board supplying current to the motor, and a control board electrically connected to the power board controlling the drive of the motor through the power board, and a heat sink absorbing and dissipating the heat generated by the power board. The heat sink, the power board and the control board are arranged after the motor in the mentioned order. In said electric drive device, the power board covers the cross section of the motor case.

Since the power board is arranged so as to cover the cross section of the motor case, it allows arranging the distinct elements of said power board such that they are better distributed in a single part and facing the heat sink. Therefore on one hand, the number of parts of the electric drive device is reduced because the power board covers a larger surface in a single part. On the other hand, heat dissipation, and therefore thermal efficiency, of the electric drive device improves, because the motor, which generates heat, discharges said heat perimetrally towards the motor case, and the heat arriving to the heat sink is mainly from the power board located on said heat sink. A more compact design of the electric drive device is further obtained because by covering the cross section of the motor case as the elements of the power board are arranged in said cross section a smaller power board is obtained.

These and other advantages and features will become evident in view of the drawings and the detailed description.

DETAILED DESCRIPTION

Figure 1:
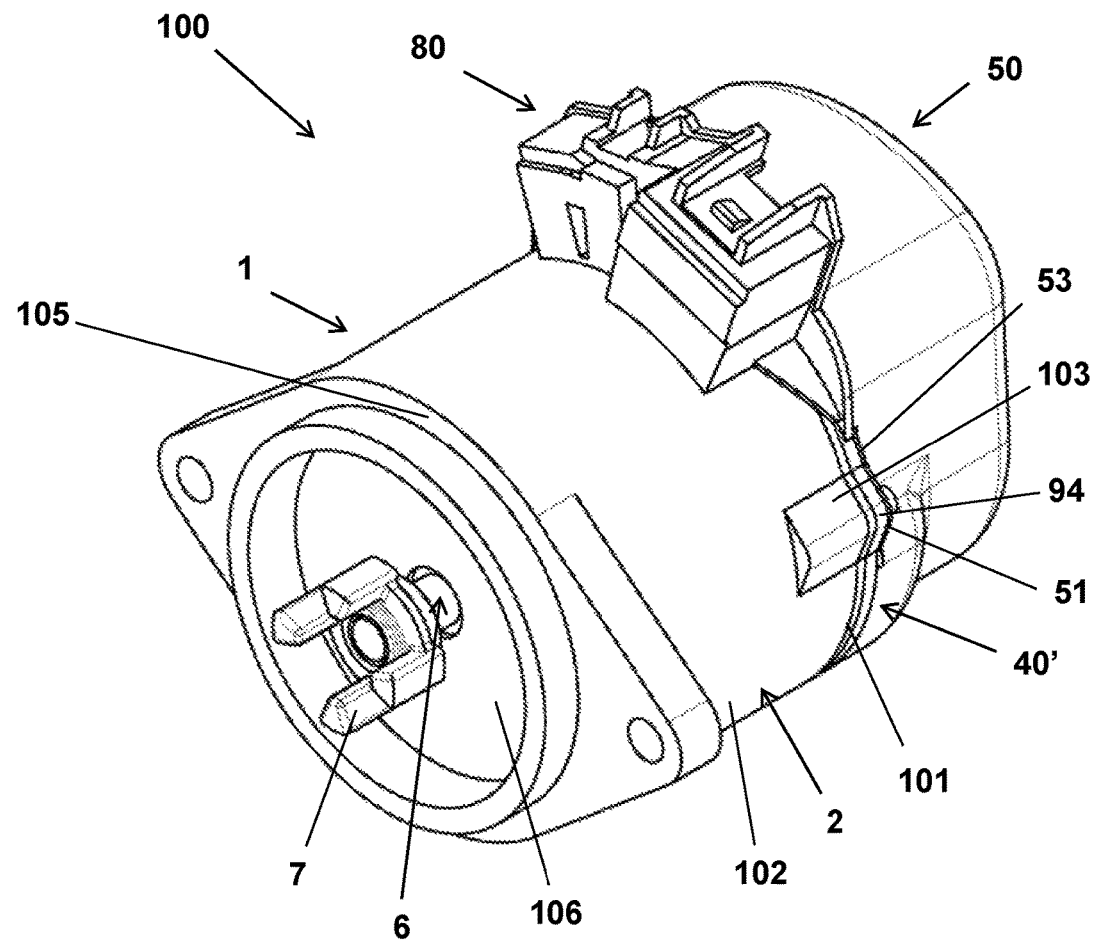
FIG. 1 shows a perspective view an electric drive device according to one embodiment.
Figure 2:
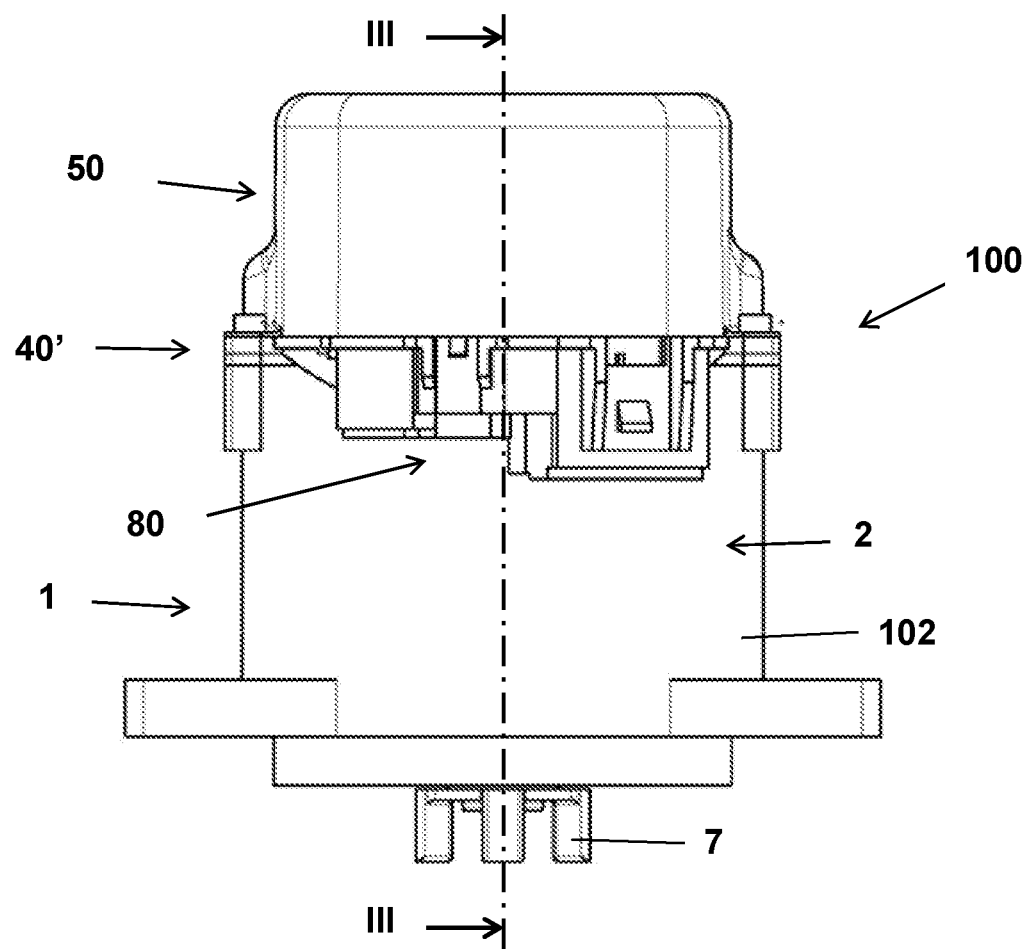
FIG. 2 shows an elevational view of the device of FIG. 1.
Figure 3:
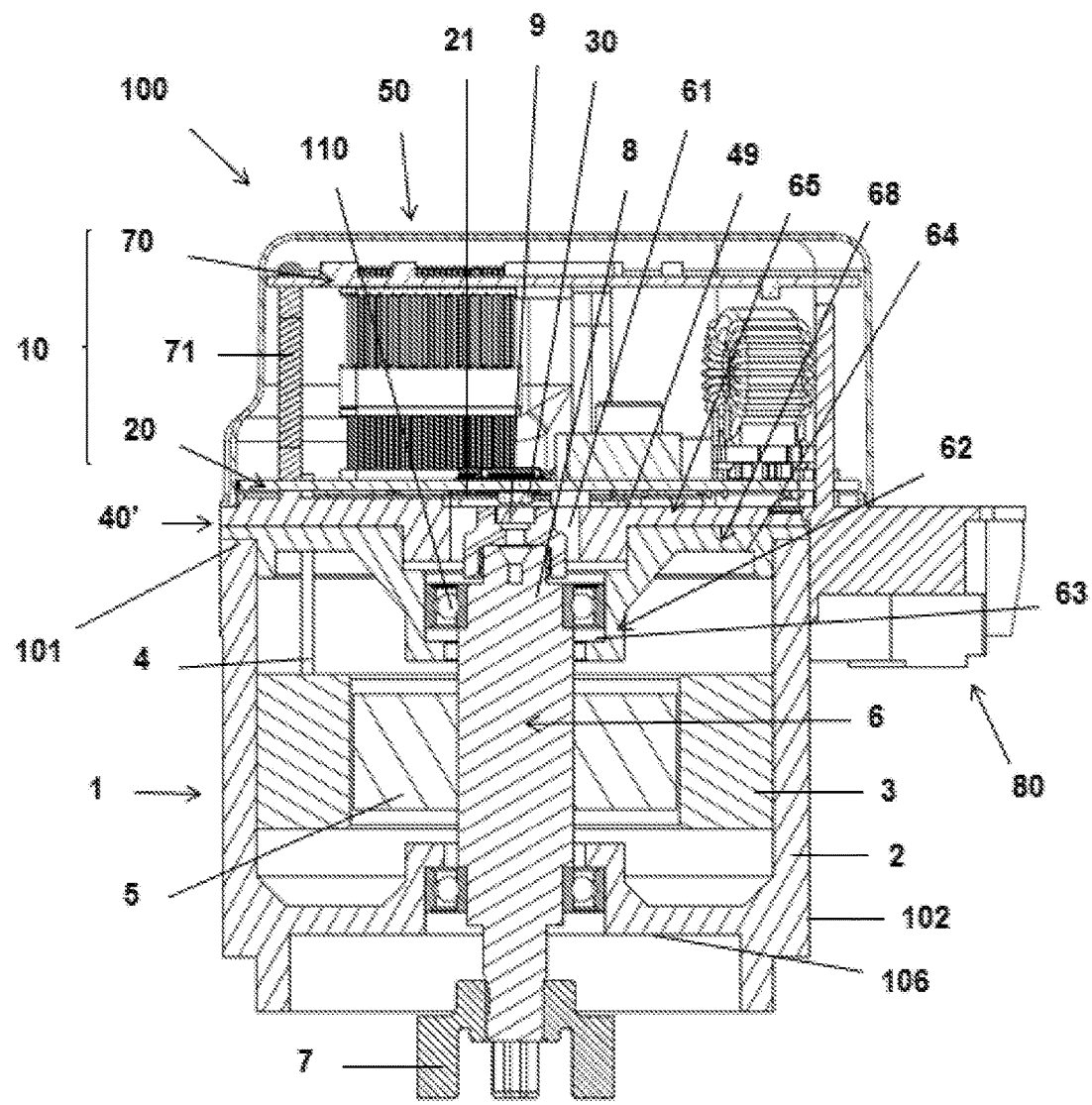
FIG. 3 shows a longitudinal section view according to line III-III of the device of FIG. 2.
Figure 4:
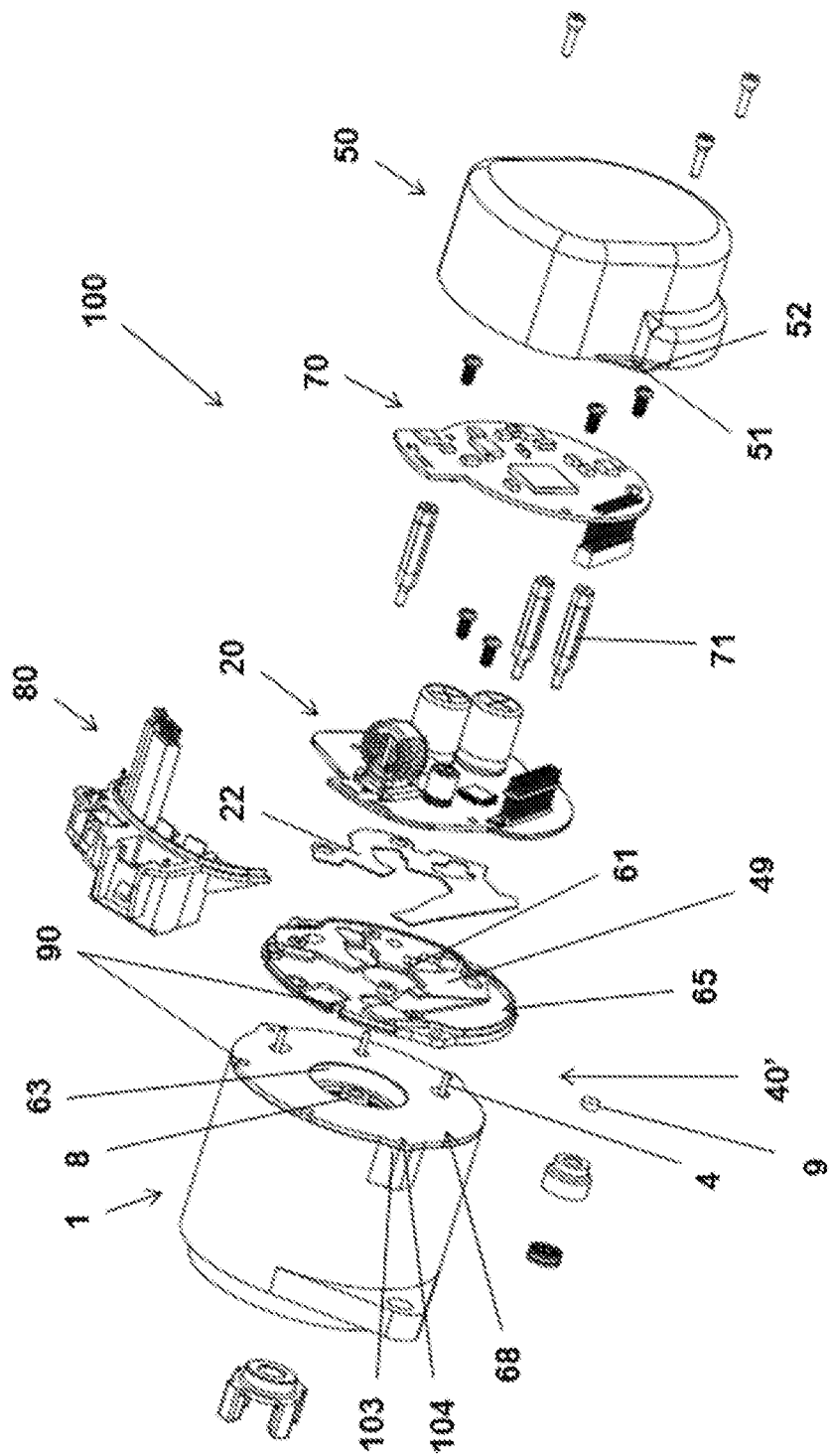
FIG. 4 shows an exploded view of the main parts of the device of FIG. 1.
Figure 5:
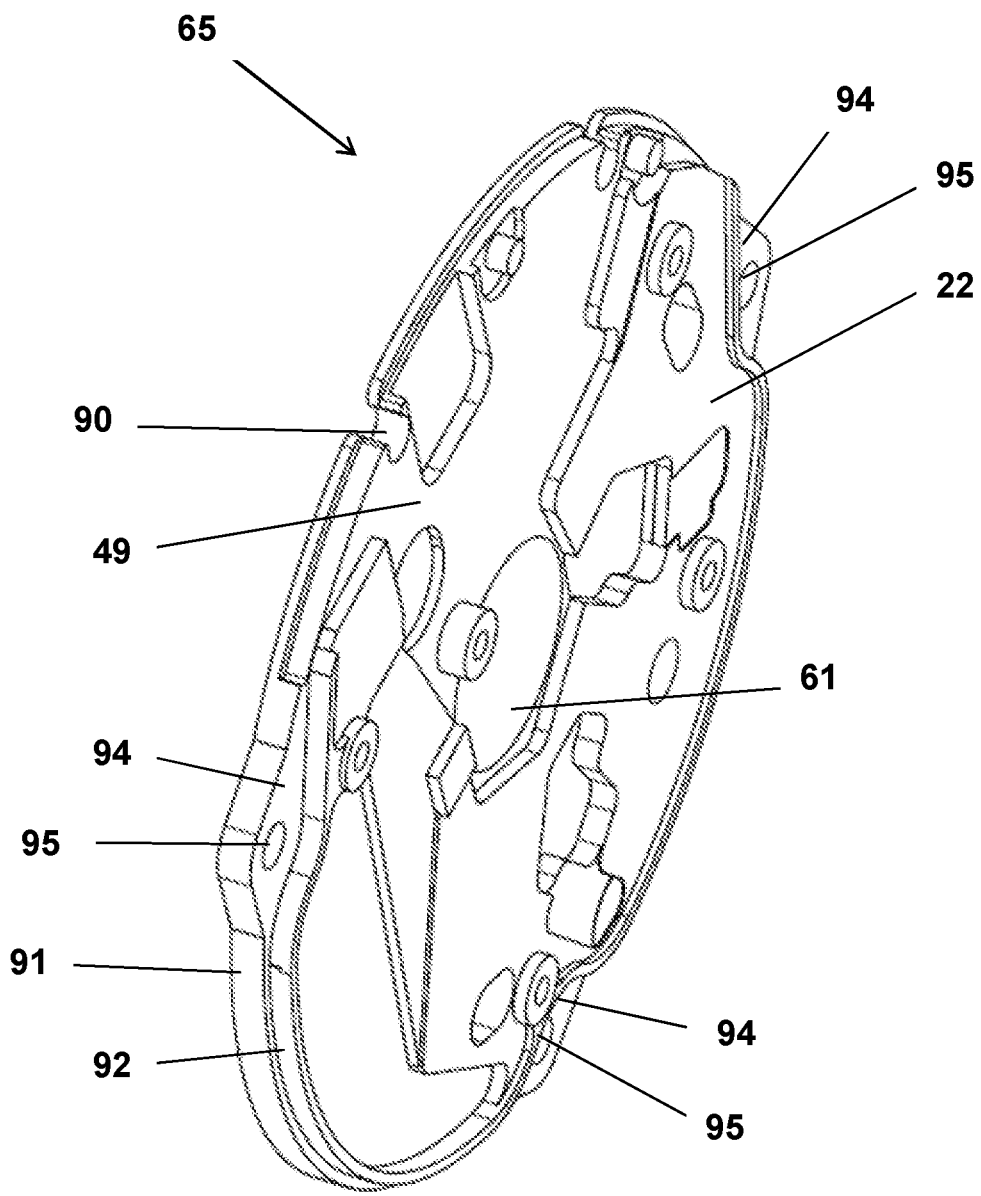
FIG. 5 shows a perspective view of the outer side of the second part of an embodiment of the heat sink of the device of FIG. 1.

FIG. 1 shows a perspective view of an electric drive device according to one embodiment, FIG. 2 shows an elevational view of the device of FIG. 1, FIG. 3 shows a longitudinal section view according to line III-III of the device of FIG. 2, FIG. 4 shows an exploded view of the main parts of the device of FIG. 1, and FIG. 5 shows a perspective view of the outer side of the second part of an embodiment of the heat sink of the device of FIG. 1.

The electric drive device 100 is applied to an electric power steering (EPS) system of an automotive vehicle. Said device 100 comprises an electric motor 1 arranged inside a motor case 2 made of aluminum. The motor 1 is the power supply source of the EPS system, said motor 1 in this embodiment being a three-phase brushless alternating current (AC) motor. Said motor 1 basically comprises a stator 3 arranged inside the motor case 2, a rotor 5 arranged rotatably in relation to the stator 3 therein, and a motor shaft 6 that rotates together with the rotor 5 in an integral manner, said motor shaft 6 comprising a drive end 7 of the output torque of the motor 1 projecting from the motor case 2.

The rotor 5 is a permanent magnet-type rotor with a plurality of poles, and the stator 3 includes a plurality of projecting poles arranged facing the permanent magnet of the rotor 5 around same. The stator 3 comprises a plurality of windings arranged around the poles of the stator 3, and three phases 4 (U, V, W) with terminals projecting from the motor case 2 being connected to these windings.

In this embodiment of the device 100, the motor case 2 has a substantially cylindrical shape. It comprises a side wall 102 and an end 105 with a lid 106 formed in the actual motor case 2, where the drive end 7 of the motor shaft 6 projects. The device 100 is used by an EPS system to provide assistance in moving the steering wheel of an automotive vehicle, said assistance consisting of the EPS system delivering mechanical torque from the steering column of the automotive vehicle. In order to generate the delivery torque, the EPS system comprising the electric drive device 100 has an electric motor 1. This motor 1 generates the mechanical torque and delivers it through the drive end 7 of the motor shaft 6. This drive end 7 is coupled to a reduction gear of the EPS system (not shown in the drawings), which in turn is connected to the steering column of the vehicle. Therefore, when the vehicle driver operates the steering wheel a mechanical torque is generated in the steering column that is detected by a torque sensor (not shown in the drawings). The detected torque is sent as a signal to the device 100, which generates a mechanical torque by means of the electric motor 1, said torque being transmitted to the reduction gear of the EPS system, and this EPS system transmits it to the steering column of the vehicle, assisting the driver in moving the steering wheel.

In order to perform such operations in a controlled manner, the device 100 also comprises an electronic control unit 10 controlling the drive of the motor 1 with the electric current supply. The electronic control unit 10 comprises a power board 20 with semiconductor switching elements 23, 25, 27 supplying current to drive the motor 1, and a control board 70 electrically connected to the power board 20 controlling the drive of the motor 1 through the power board 20. The device 100 also comprises a heat sink 40, 40' made of highly thermally conductive aluminum, absorbing and dissipating the heat generated mainly by the power board 20 through the semiconductor switching elements 23, 25, 27. Furthermore, the electric drive device 100 comprises a cover 50 which covers the electronic control unit 10 and closes it at one end 53 against an end 101 of the motor case 2. The assembly of the device 100 is therefore a compact unit formed by the motor case 2 and the cover 50, the motor 1, the heat sink 40, 40', the power board 20 and the control board 70 being arranged in the mentioned order with respect to the drive end 7 of the motor shaft 6. The power board 20, which is located after the heat sink 40, 40', covers all or almost all of the cross section of the motor case 2. In document EP2549627 A1, the power board containing the semiconductor switching elements only partially covers the cross section of the motor. Having the power board 20 cover all or almost all of the cross section of the motor case 2 allows arranging the distinct elements of said power board such that they are better distributed in a single part and facing the heat sink.

In this embodiment, the heat sink 40, 40' is a substantially cylindrical part acting as a cover of the motor case 2 at the end 101, and therefore is another element of said case 2. In this embodiment of the device 100, the heat sink 40; 40' comprises a substantially planar outer side 47, 49 distributed in a substantially uniform manner, facing and adjacent to the power board 20. The heat sink 40, 40' is arranged at the end 101 of said motor case 2, on the side opposite the lid 106 of the case 2, and thus closes the cylindrical shape of the motor case 2. The heat sink 40; 40' acting as closure lid of the motor case 2 comprises an inner side 46; 64 that is located inside the motor case 2. Said heat sink 40; 40' does not project or only slightly projects from the motor case 2.

A position end 8 of the motor shaft 6, which is opposite the drive end 7 of said motor shaft 6, and therefore below the inner side 46; 64 of the heat sink 40; 40', is located at the end 101 of the motor case 2 and inside the motor case 2.

Figure 6:
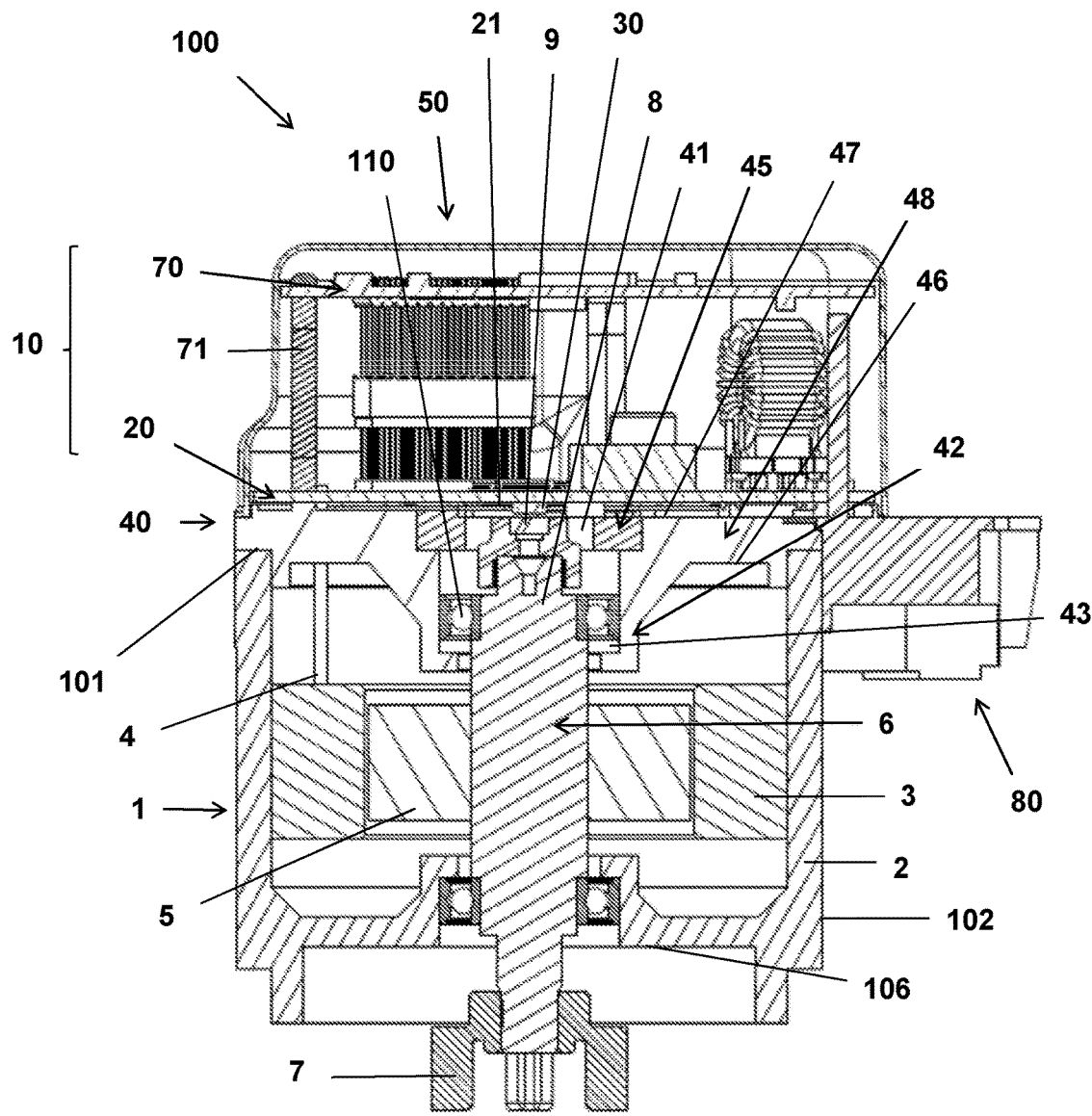
FIG. 6 shows a longitudinal section view of the device of FIG. 1 with a second embodiment of the heat sink.
Figure 7:
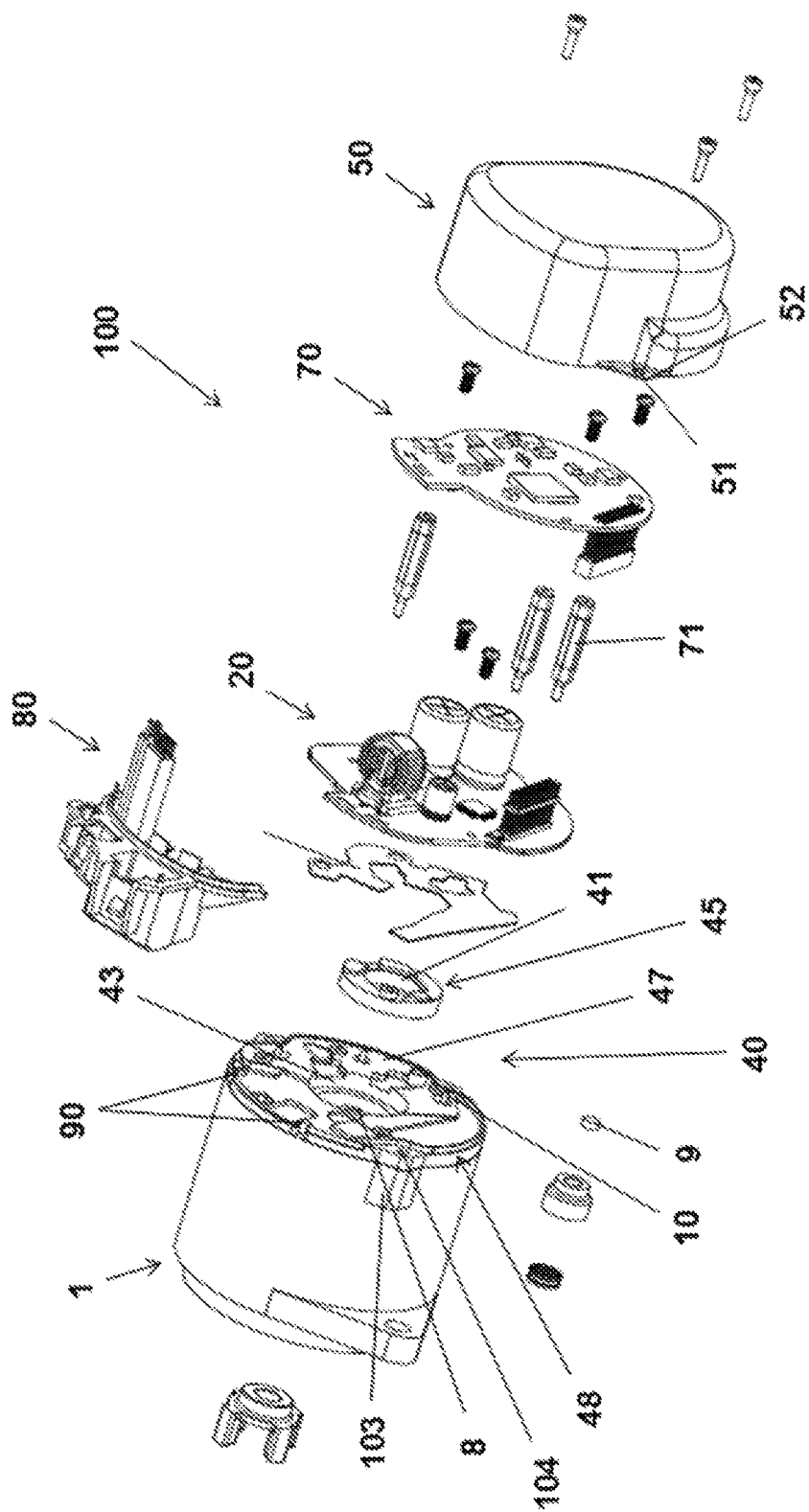
FIG. 7 shows an exploded view of the main parts of the device of FIG. 6.
Figure 8:
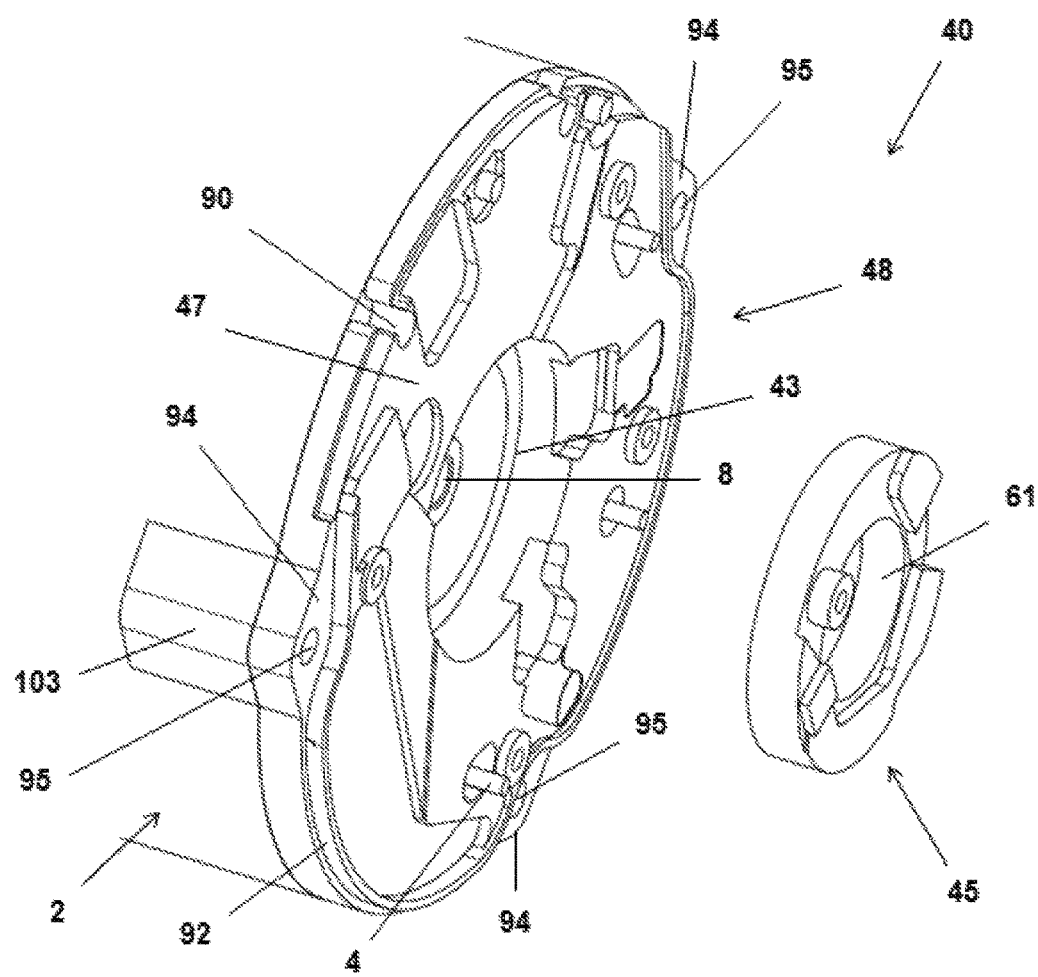
FIG. 8 shows a detailed view of the heat sink of the device of FIG. 6.

FIG. 6 shows a longitudinal section view of the device 100 of FIG. 1 with a second embodiment of the heat sink 40, FIG. 7 shows an exploded view of the main parts of the device 100 of FIG. 6, and FIG. 8 shows a detailed view of the heat sink 40 of the device of FIG. 6. In this embodiment, the heat sink 40 has a substantially cylindrical shape comprises two parts. A first part 48 is supported in the motor case 2, the inner side 46 of which comprises support means 42. The support means 42 comprises a housing 43 arranged substantially in the center of the first part 48, the housing 43 being open towards the outside of the motor case 2, and wherein a bearing 110 supporting the position end 8 of the motor shaft 6 is fitted. A second part 45 of the heat sink 40 is arranged on the first part 48, covering the housing 43, and has a through hole 41 in the center having a diameter that is smaller than the opening of the housing 43. The heat sink 40 thus comprises the outer side 47, which is the free outer surface of the first part 48. The first part 48 is made of a highly thermally conductive material, such as aluminum for example, and the second part 45 is a metal part made of pressed steel that has been subjected to anti-corrosion treatment, such as cataphoresis.

The embodiment of the heat sink 40' of FIGS. 3, 4 and 5 shows how said heat sink 40' also has a substantially cylindrical shape and comprises two parts. A first part 68 is supported in the motor case 2, the inner side 64 of which comprises support means 62. The support means 62 comprises a housing 63 arranged substantially in the center of the first part 68, the housing 63 being open towards the outside of the motor case 2, and wherein a bearing 110 supporting the position end 8 of the motor shaft 6 is fitted. A second part 65 of the heat sink 40 is arranged on the first part 68, covering the entire surface of the first part 68, and covering the housing 63, and has a through hole 61 in the center having a diameter that is smaller than the opening of the housing 63. The heat sink 40' thus comprises the outer side 49, which is the free outer surface of the second part 65. Both the first part 68 and the second part 65 are made of a highly thermally conductive material, such as aluminum.

In both embodiments of the heat sink 40; 40', the drive end 7 of the motor shaft 6 is housed in another bearing arranged in the support means of the lid 106 of the motor case 2. The bearing 110 is housed in the housing 43; 63 from the outside of the motor case 2 and after the first part 48; 68 is assembled in said motor case 2. The heat sink 40; 40' comprises a second part 45; 65 which covers the hole of the housing 43; 63, demarcating a hole 41; 61, having a smaller diameter than the hole of the housing 43; 63, preventing accessibility to the housing 43; 63, and thus completing the dissipation surface of the power board 20. The bearing 110 is thus assembled in the housing 43; 63 of the heat sink 40; 40' from the outside, and next the second part 45; 65 is assembled in the heat sink 40; 40'. Therefore, when the motor shaft 6 is assembled, the position end 8 is located inside the housing 43; 63 of the heat sink 40; 40' and is substantially flush with the outer side 47; 49 of the heat sink 40; 40'. The position end 8 of the motor shaft 6 comprises a magnet 9, and the power board 20 comprises a magnetic sensor 30 on a lower side 21 facing the heat sink 40; 40' and substantially in the center, the magnetic sensor 30 facing the magnet 9 through the through hole 41; 61.

Once the heat sink 40; 40' is assembled in the motor case 2, next the power board 20 and the control board 70 are assembled, being arranged in the mentioned order in a substantially parallel manner, thereby obtaining a more compact structure of the device 100, taking up less space in the length thereof.

Figure 9:
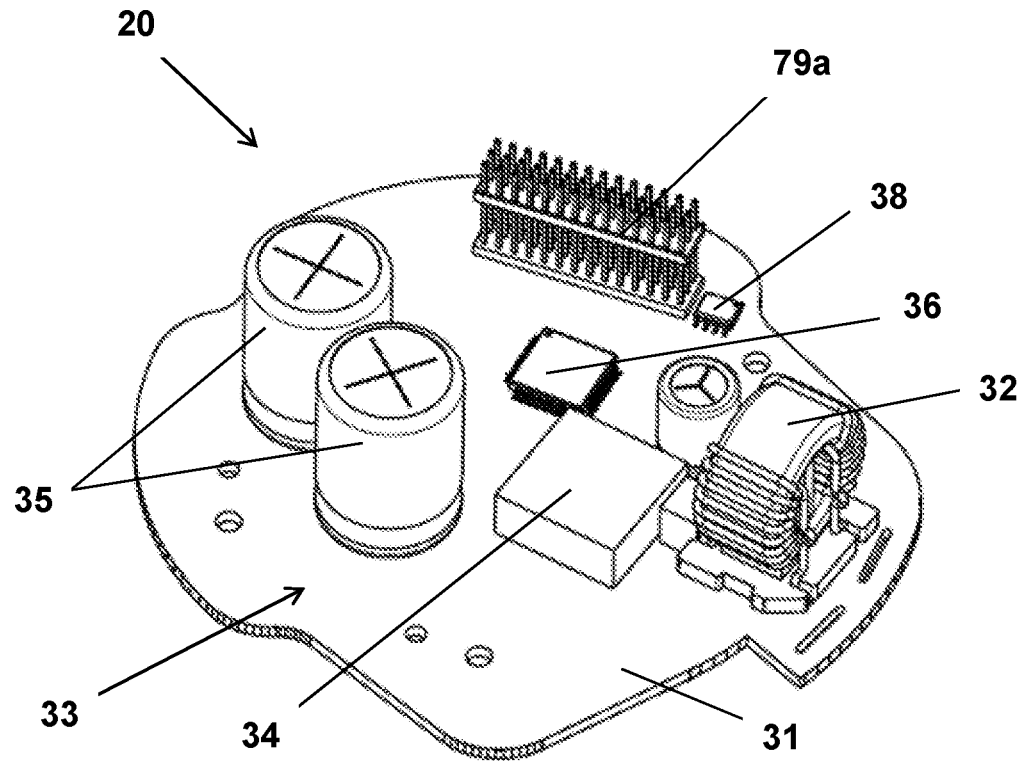
FIG. 9 shows a perspective view of the upper side of an embodiment of the power board of the device of FIG. 1.
Figure 10:
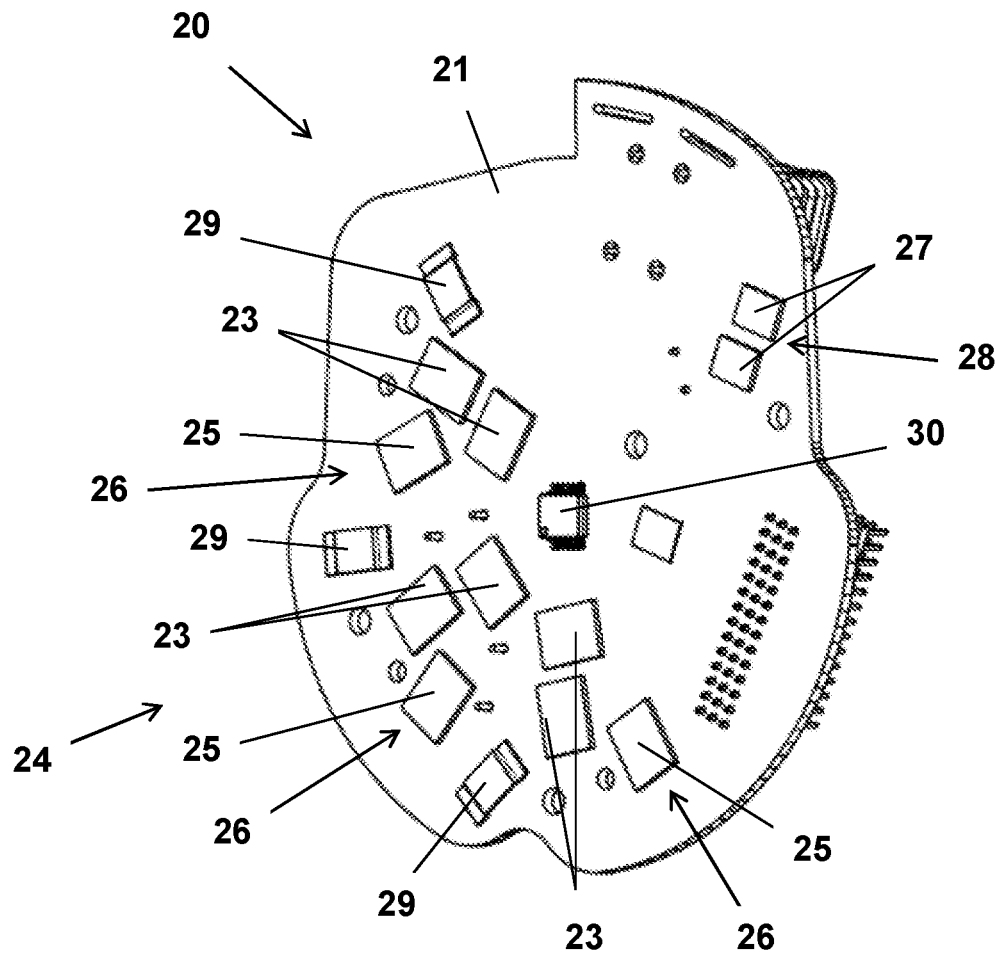
FIG. 10 shows a perspective view of the lower side of the embodiment of the power board of FIG. 9.

FIG. 9 shows a perspective view of the upper side 31 of an embodiment of the power board 20 of the device 100 of FIG. 1, and FIG. 10 shows a perspective view of the lower side 21 of the embodiment of the power board 20 of FIG. 9. Since the power board 20 covers virtually the entire cross section of the motor case 2, and since it is facing and adjacent to the heat sink 40; 40', it allows arranging the different semiconductor switching elements, filtering elements and measuring elements on a larger surface than in power boards of the state of the art, and it therefore allows distributing all the elements uniformly and in a smaller volume.

The power board 20 is a printed circuit board (PCB) formed on an insulating base preferably made of glass fiber, such as an FR material comprising four or six layers for example, and is screwed to the heat sink 40; 40', the power board 20 and the heat sink 40; 40' being located very close to one another at a distance between about 0.5 mm and about 2.5 mm. Semiconductor switching elements 23, 25, 27 supplying electric current to the motor 1 from the outside are assembled on the lower side 21 of the power board 20, facing the heat sink 40; 40', and they are located at the closest distance with respect to the heat sink 40; 40'. When the power board 20 is assembled on the heat sink 40; 40', the semiconductor switching elements 23, 25, 27 rest on a support surface 22 of the outer side 47; 49 of the heat sink 40; 40'. Said support surface 22 is a surface made from an electrically insulating and highly thermally conductive material, and it can be an elastic pad or be applied as an adhesive paste on the outer side 47, 49, attached to the heat sink 40; 40'. Thus, without electrical interferences, the semiconductor switching elements 23, 25, 27 transmit the heat generated to the heat sink 40; 40' through the support surface 22. Three shunts 29 are also assembled on the lower side 21 of the power board 20, there being one for each of the phases 4 (U, V, W), said shunts being a resistive load through which electric current is shunted. Since the resistive load of the shunts 29 is known with precision, said shunts 29 are used for determining the intensity of the electric current flowing through this load and therefore for measuring the electric current in the phases 4 (U, V, W) of the motor 1.

In this embodiment, the semiconductor switching elements are two semiconductor switching elements 23 for each of the phases 4 (U, V, W) of an inverter 24 forming a circuit which allows converting input direct current DC into three-phase alternating current AC. Said semiconductor switching elements 23 power the motor 1, being connected with the terminals of the phases 4 projecting from the motor case 2 through the heat sink 40; 40' through the through holes of said heat sink 40; 40', the semiconductor switching elements 23 being arranged directly on the terminals of the phases 4. A semiconductor switching element 25 for each of the phases 4 (U, V, W) of three phase relays 26 of the motor 1, which allow protecting the motor 1 of the current supply when adverse conditions are present, and also two semiconductor switching elements 27 of two power supply relays 28 supplied by an external power source V, which is the battery of the vehicle, and supplies direct current DC. Said power supply relays 28 protect the motor 1 and components of the circuit of the inverter 24 when disconnections, short circuits, excessive temperatures or voltage surges occur.

The power board 20 also comprises on the side 21 facing the heat sink 40; 40' a temperature sensor ST arranged close to the semiconductor switching elements 23 of the inverter 24 and the semiconductor switching elements 25 of the phase relays 26 of the motor 1, since they are the most important heat generators and therefore where the temperature can be the highest. If the temperature sensor ST detects that the temperature exceeds a defined threshold temperature, it sends a signal that is picked up by a microprocessor 73 arranged in the control board 70 controlling the drive of the motor 1. This microprocessor 73 switches to protection mode and first reduces the mechanical torque generated by the motor 1, reducing the intensity of the electric current supplied by the motor 1, thus reducing the level of assistance in moving the steering wheel of the vehicle. If the temperature does not stabilize, it can end up completely shutting down the movement assistance to the steering wheel of the vehicle.

The phase relays 26 of the motor 1 and the power supply relays 28 are solid-state relays. Solid-state relays have a long service life and are more reliable than mechanical relays when exposed to blows and vibrations. They are smaller in size, require less control power and have very short response times. The loads are switched without bouncing and switching noise is not generated. Neighboring components are not disrupted during switching due to the electromagnetic radiation usually generated by the coils or sparks of mechanical relays. The semiconductor switching elements 25 of the phase relays 26, the semiconductor switching elements 27 of the power supply relays 28, and the semiconductor switching elements 23 of the inverter 24 are planar MOSFET transistors, which allows them to take up minimal space between the power board 20 and the heat sink 40; 40'. These transistors have a cut-off temperature of between about 105° C. and about 110° C.

The power board 20 has a magnetic sensor 30 on the side 21 facing the heat sink 40; 40', and substantially in the center, said sensor being a Hall effect position sensor. This sensor uses the Hall effect to determine a position. If current flows through a Hall sensor and approaches a magnetic field flowing vertically with respect to the sensor, then the sensor creates an output voltage proportional to the product of the strength of the magnetic field and of the current. The position end 8 of the motor shaft 6 has a magnet 9, which in this embodiment is a two-pole permanent neodymium magnet enclosed in a plastic part and generating a magnetic field. This magnetic field generated by the magnet 9 is sensed by the magnetic sensor 30, said sensor 30 generating a voltage which is sent as a signal corresponding to a direction of the generated magnetic field. This signal is sent to the microprocessor 73, such that the electronic control unit 10 knows the position of the motor shaft 6 at all times, and thus knows the position of the poles of the permanent magnet of the rotor 5. Therefore, and according to the situation of the vehicle, i.e., stopped or moving, and its speed, the microprocessor 73 can decide how to drive the motor 1 of the device 100. Since the magnet 9 is arranged in the position end 8 of the motor shaft 6, and since the magnetic sensor 30 is arranged in the power board 20, which face one another through the through hole 41; 61, and said power board 20 and the heat sink 40; 40' being very close, a shorter motor shaft 6 is obtained, and this contributes to a more compact design of the device 100.

The power board 20 comprises an upper side 31 facing the control board 70, a choke coil 32 being assembled on said side 31. This choke coil 32, which is fundamentally configured by two windings on a ferrite, allows protecting electronic equipment against high frequency disturbances, particularly by dissipating and dispersing high frequency currents. In the circuit of the electronic control unit 10, the choke coil 32 is electrically connected between the external power source V and the power supply relays 28. A power filter 33 comprising a coil 34 and two capacitors 35 is also assembled on the side 31 of the power board 20. This power filter 33 allows blocking emissions, suppressing noises generated outside the device 100 and inside the device 100, such as noises generated by the motor 1 for example. The power filter 33 is electrically connected between the power supply relays 28 and the inverter 24. A series of drive circuits for driving circuits with electronic components are also assembled on the side 31 of the power board 20. It therefore comprises a drive circuit 36 of the inverter 24, a drive circuit 37 of the phase relays 26 of the motor 1, and a drive circuit 38 of the power supply relays 28. A connector 79a which allows connecting the power board 20 and the control board 70, which allows sending signals, is also assembled on said upper side 31 of the power board 20.

To enable assembling the control board 70 in parallel and after the power board 20, and to prevent the components assembled on the side 31 of said power board 20 from physically interfering with the components of a lower side 72 of the control board 70, the power board 20 and the control board 70 are spaced by three spacers 71.

Figure 11:
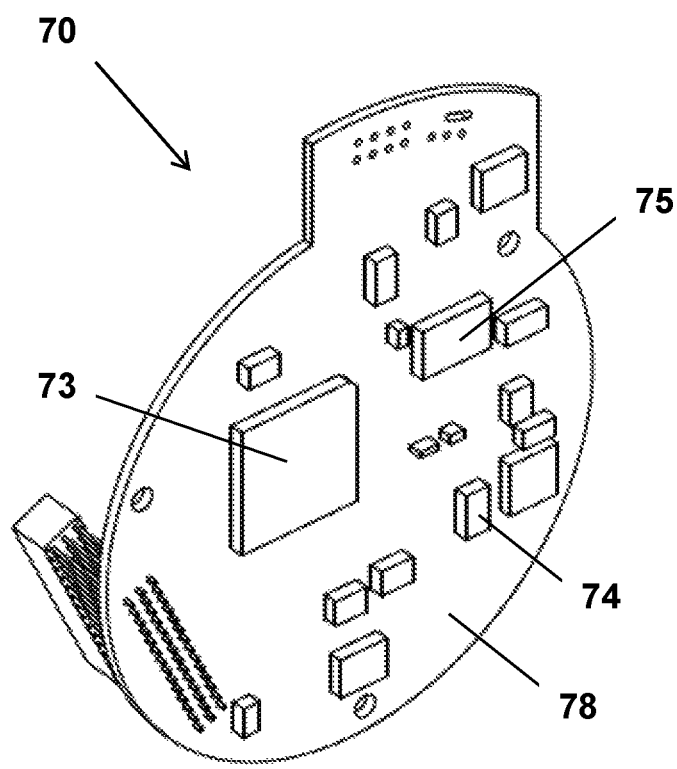
FIG. 11 shows a perspective view of the upper side of an embodiment of the control board of the device of FIG. 1.
Figure 12:
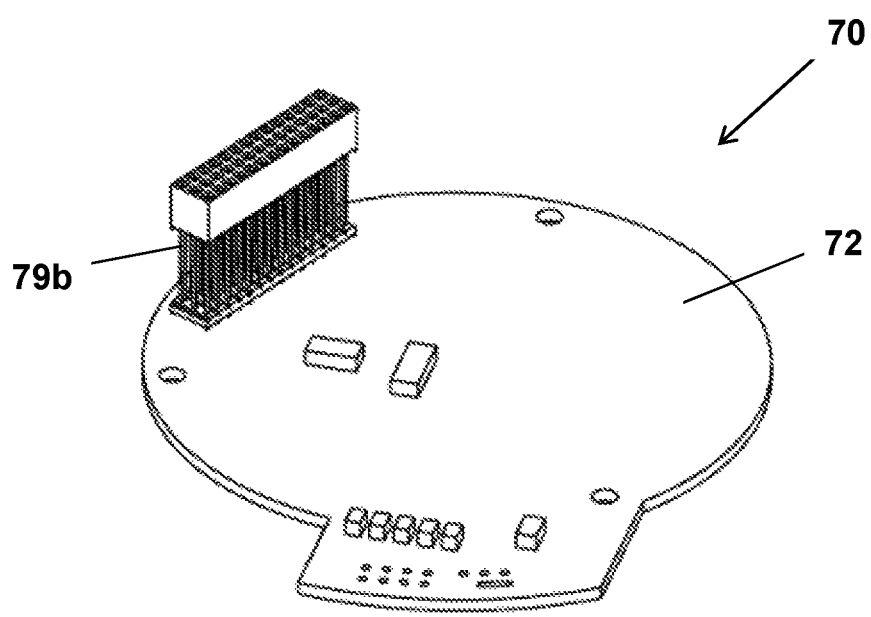
FIG. 12 shows a perspective view of the lower side of the embodiment of the control board of FIG. 11.

FIG. 11 shows a perspective view of the upper side 78 of an embodiment of the control board 70 of the device 100 of FIG. 1, and FIG. 12 shows a perspective view of the lower side 72 of the embodiment of the control board 70 of FIG. 11. The control board 70 is a printed circuit board (PCB) formed on an insulating base which, like the power board 20, is preferably made of glass fiber, both boards 20 and 70 being spaced by means of spacers 71. At least one microprocessor 73 receiving signals from the different sensors of the EPS system, controlling communication with the vehicle, performing all calculations, sending signals to the inverter 24 and to the power supply relays 28 and to the phase relays 26, and managing the status of the EPS system is assembled on the upper side 78 of the control board 70, opposite the cover 50 of the device 100. The upper side 78 of the control board 70 also comprises a supervision device 74 for supervising SBC communications with security functions, such as controlling power supply relays 28 for example, and for controlling consumption, performing the functions of supervising and communicating with the vehicle. A power source 75, which is connected with the external power source V and powers at least the microprocessor 73, the torque sensor which is located in the steering column of the vehicle, and a micro re-initializer R receiving signals from the supervision device 74 and sending signals to the microprocessor 73, is also assembled on said upper side 78. A connector 79b which allows connecting with the connector 79a of the upper side 31 of the power board 20, which allows sending signals between both boards, is also assembled on the lower side 72 of the control board 70.

Figure 13:
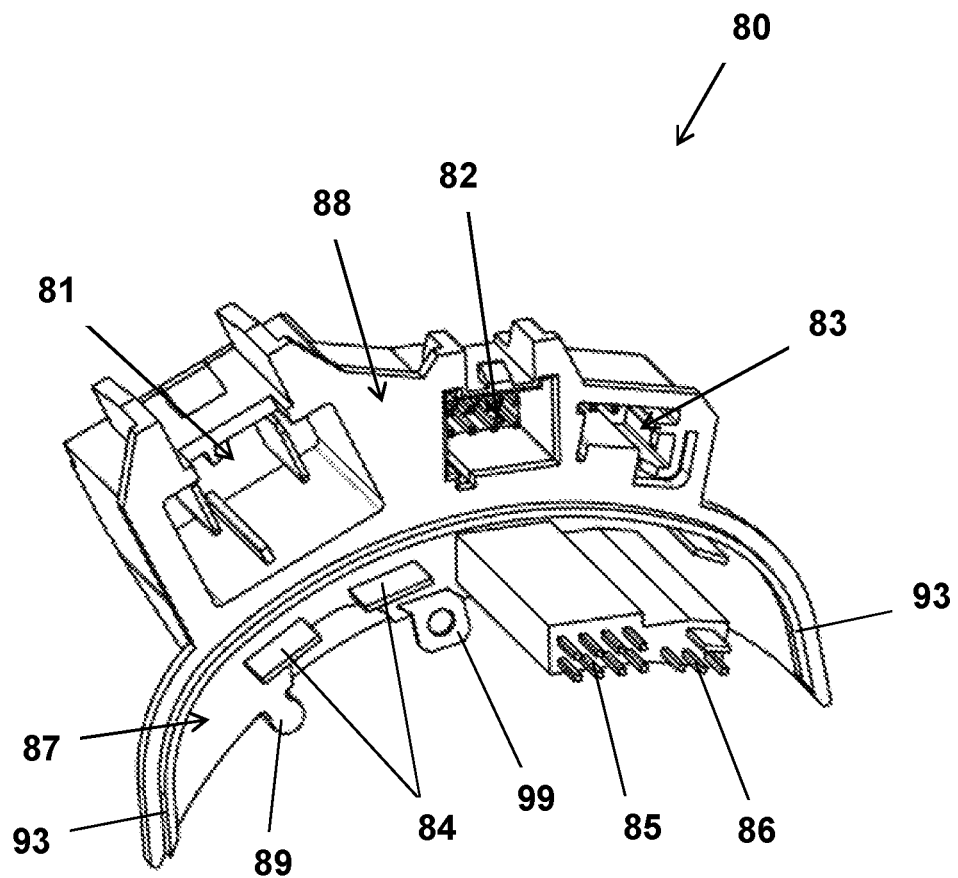
FIG. 13 shows a front perspective view of an embodiment of the connector of the device of FIG. 1.
Figure 14:
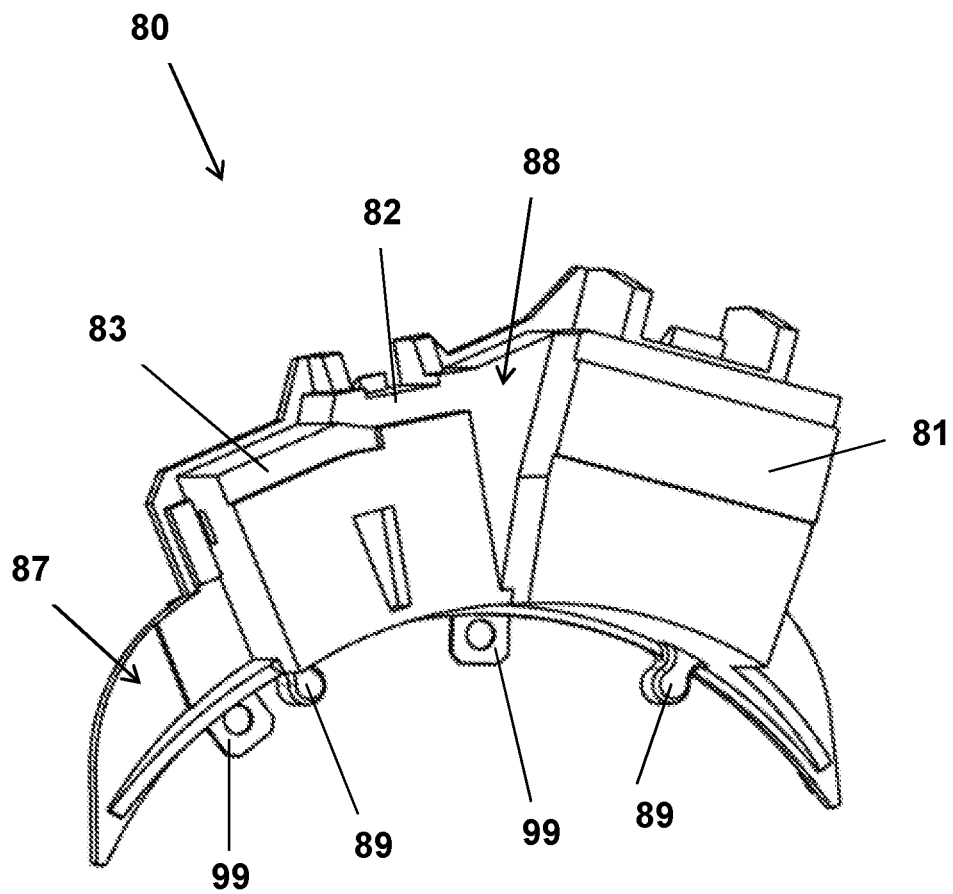
FIG. 14 shows a rear perspective view of the embodiment of the connector of FIG. 13.

FIG. 13 shows a front perspective view of an embodiment of the connector of the device of FIG. 1, and FIG. 14 shows a rear perspective view of the embodiment of the connector of FIG. 13. The electric drive device 100 also comprises a connector 80 which allows connecting the electronic control unit 10 with the outside by wiring. To operate, the device 100 needs on one hand power, which can be supplied by the battery of the vehicle, and on the other hand information about the mechanical torque applied to the steering column of the vehicle to thus define the torque that must be generated and delivered by the device 100, and it also needs to be communicated with the vehicle in order to know the status of different functions thereof, such as for example the start of the vehicle, when it is moving or stopped, the speed of said vehicle, etc. To that end, said connector 80 comprises a power supply housing 81 receiving power from the outside, an electric torque signal housing 82 receiving the torque signal from the outside, and a communications housing 83 which allows receiving and sending communication signals. The connector 80 also comprises terminals 84 which allow directly connecting said connector 80 with the power board 20 through the power supply housing 81, and therefore supplying power from the battery of the vehicle. The connector 80 also comprises terminals 85 which allow connecting directly with the control board 70 through the electric torque signal housing 82, and therefore being able to send the torque signal to the control board 70, and terminals 86 which allow connecting directly with the control board 70 through the communications housing 83, thereby allowing communication from the outside to the control board 70.

Figure 15:
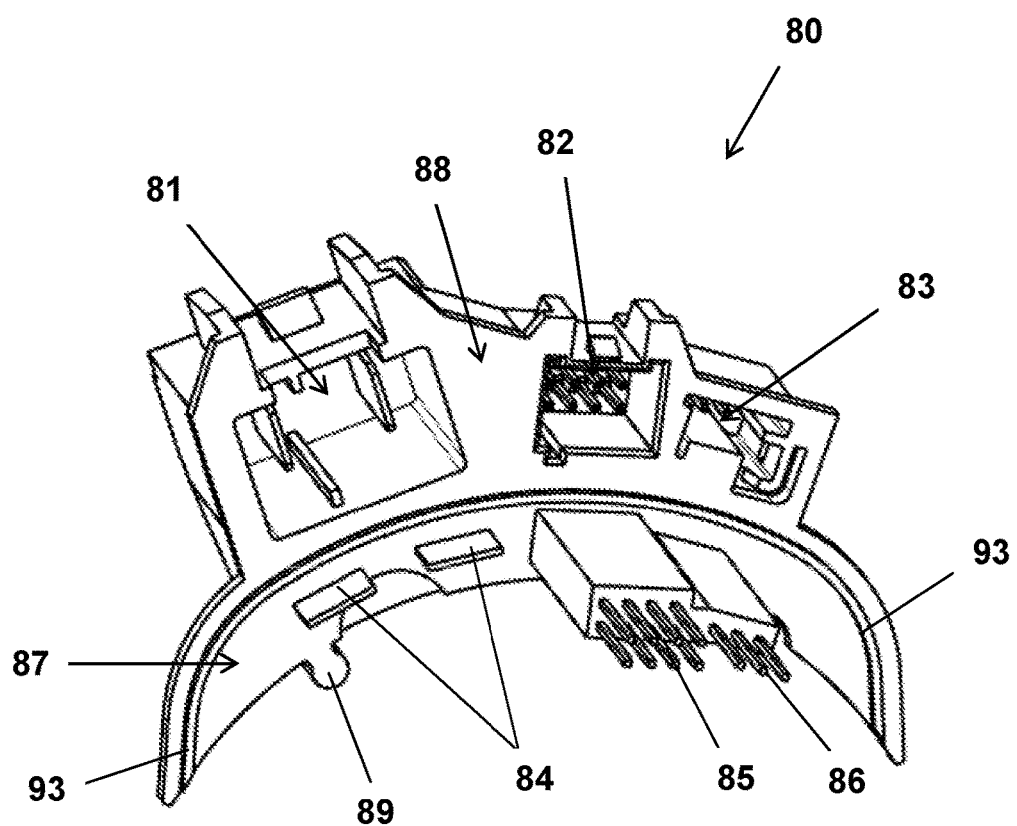
FIG. 15 shows a front perspective view of a second embodiment of the connector of the device of FIG. 1 without ground connections.
Figure 16:
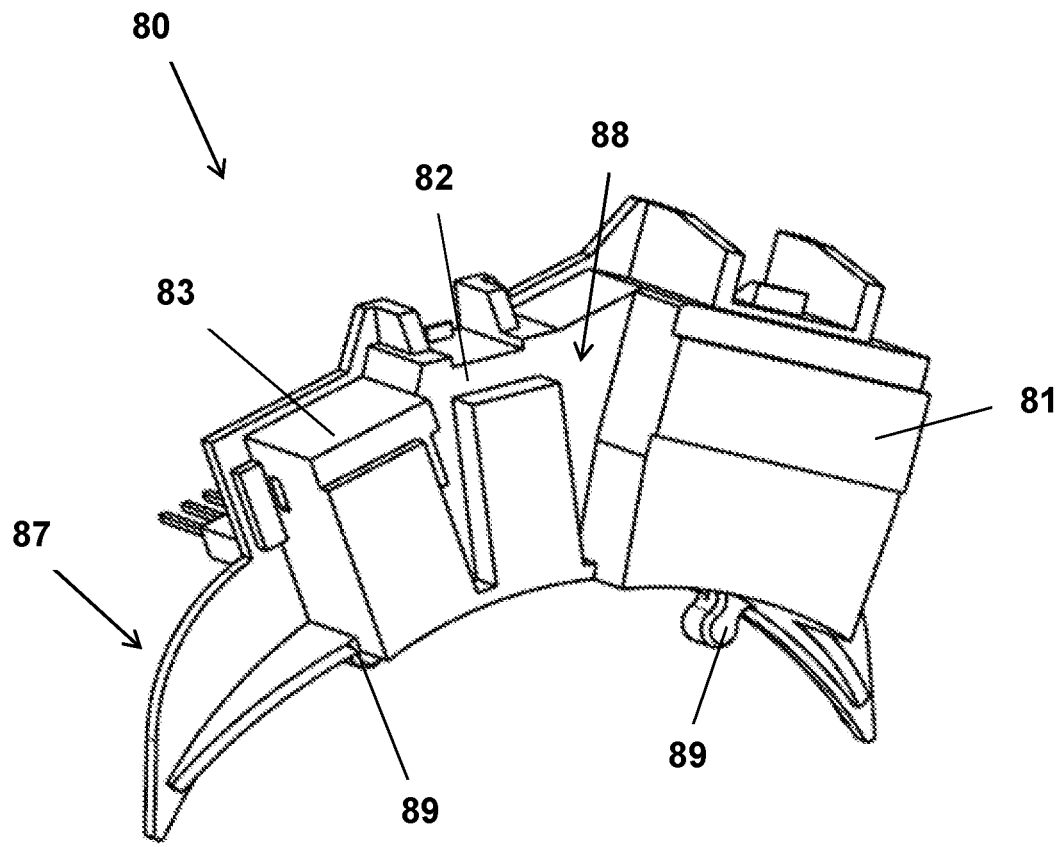
FIG. 16 shows a rear perspective view of the embodiment of the connector of FIG. 15.

The connector 80 also comprises ground connections 99, which in the embodiment shown in FIGS. 13 and 14, are two in number, attached to the negative connection of the battery of the vehicle through the terminals 84 of the power supply housing 81, and said ground connection is taken to the power board 20 and to the control board 70. The electric drive device 100 may not comprise said ground connections 99, as shown in a second embodiment of the connector 80 in FIGS. 15 and 16, but the operation of the device is more efficient with such connections because they improve radio emissions and the immunity of the device 100.

The connector 80 is attached to the device 100 laterally from the outside. The connector 80 comprises two areas, a first area 87 which is physically attached to the device 100, said first area 87 comprising the terminals 84, 85, and 86. It also comprises a second area 88 which is attached to the first area 87 and is arranged outside the device 100 when said device 100 is completely assembled. This second area 88 comprises the power supply housing 81, the electric torque signal housing 82, and the communications housing 83. In this embodiment, the first area 87 comprises two protrusions 89 projecting from the first area 87 in a plane perpendicular to the geometric axis of the motor shaft 6. The connector 80 is thus prepared for being assembled in a portion of the device 100 which comprises housings that allow housing the protrusions 89. Since the connector 80 comprises two areas 87 and 88, once the connector 80 is assembled in the device 100, it allows the first area 87 to be concealed in the device 100 and the second area 88 to be accessible from the outside to enable being connected with the housings 81, 82 and 83. Therefore, and according to the connection requirements of each customer, the outer design can be modified without modifying the design of the power board 20 and control board 70.

In the embodiments shown in FIGS. 4, 5, 7 and 8, the heat sink 40; 40' comprises two lobe-shaped housings 90 arranged on an edge 91 of the periphery of said heat sink 40; 40'. Once the device 100 is assembled with the motor 1, the heat sink 40; 40', the power board 20 and control board 70, the housings 90 of the heat sink 40; 40' are in view and allow housing the protrusions 89 of the first area 87, which in this embodiment have the same identical lobe shape as the housings 90 of the heat sink 40; 40'. The protrusions 89 are assembled in the housings 90 from top to bottom, and extraction of the protrusions 89 in the radial direction, and therefore extraction of the connector 80 when the device 100 is assembled, is thereby prevented. With this design of the device 100, the connector 80 can be inserted and fixed without requiring fixing means, such as screws.

The connector 80 could be used in electric drive devices for electric power steering systems of automotive vehicles other than those disclosed herein.

The outer side 47; 49 of the heat sink 40; 40' comprises a vertical edge 92 running along the periphery of said outer side 47; 49 in a segment that is not attached to the connector 80. The connector 80 comprises a vertical edge 93 on the upper surface of the first area 87 running along the area of intersection of said first area 87 with the second area 88. Said edges 92 and 93 are defined such that the ends of the vertical edge 92 of the heat sink 40; 40' and the ends of the vertical edge 93 of the connector 80 coincide when the connector 80 is assembled in the heat sink 40; 40', thereby forming a single edge.

In these embodiments, the heat sink 40; 40' comprises three seats 94 with holes 95 substantially parallel to the geometric axis of the motor shaft 6. Said seats 94 are arranged along the periphery of the outer side 47; 49 and are substantially spaced from one another. The motor case 2 at the end 101 of the side wall 102 comprises three seats 103 with holes 104 which are also substantially parallel to the geometric axis of the motor shaft 6. These seats 103 with their holes 104 coincide with the seats 94 and the holes 95 of the outer side 47; 49 of the heat sink 40; 40' when said heat sink 40; 40' is assembled in the motor case 2. On the other hand, the cover 50 of the device 100 comprises three seats 51 with holes 52 which are also substantially parallel to the geometric axis of the motor shaft 6, these seats 51 projecting radially from the end 53 of the cover 50. When the electric motor 1, the heat sink 40; 40', the power board 20 and the control board 70 are assembled in the device 100, it is necessary to lastly assemble the cover 50, and thus protect the device 100 against external conditions, such as moisture, dirt and also electromagnetic radiation. To that end, the cover 50 is arranged on the power board 20 and the control board 70, and its end 53 is assembled against the motor case 2, attaching the seats 51 of the cover 50 with the seats 94 of the heat sink 40; 40' with attachment means, such as screws for example, the cover 50 overlapping in that assembly with the single edge formed by the vertical edge 92 of the heat sink 40; 40' and the vertical edge 93 of the connector 80. Movement of the connector 80 in the axial direction is thereby also prevented when closing the cover 50 on the motor case 2, which prevents the entrance and exit of electromagnetic radiation as well as the entrance and exit of external elements such as dirt, and it prevents the transmission of vibrations caused by outer cables.

Figure 17:
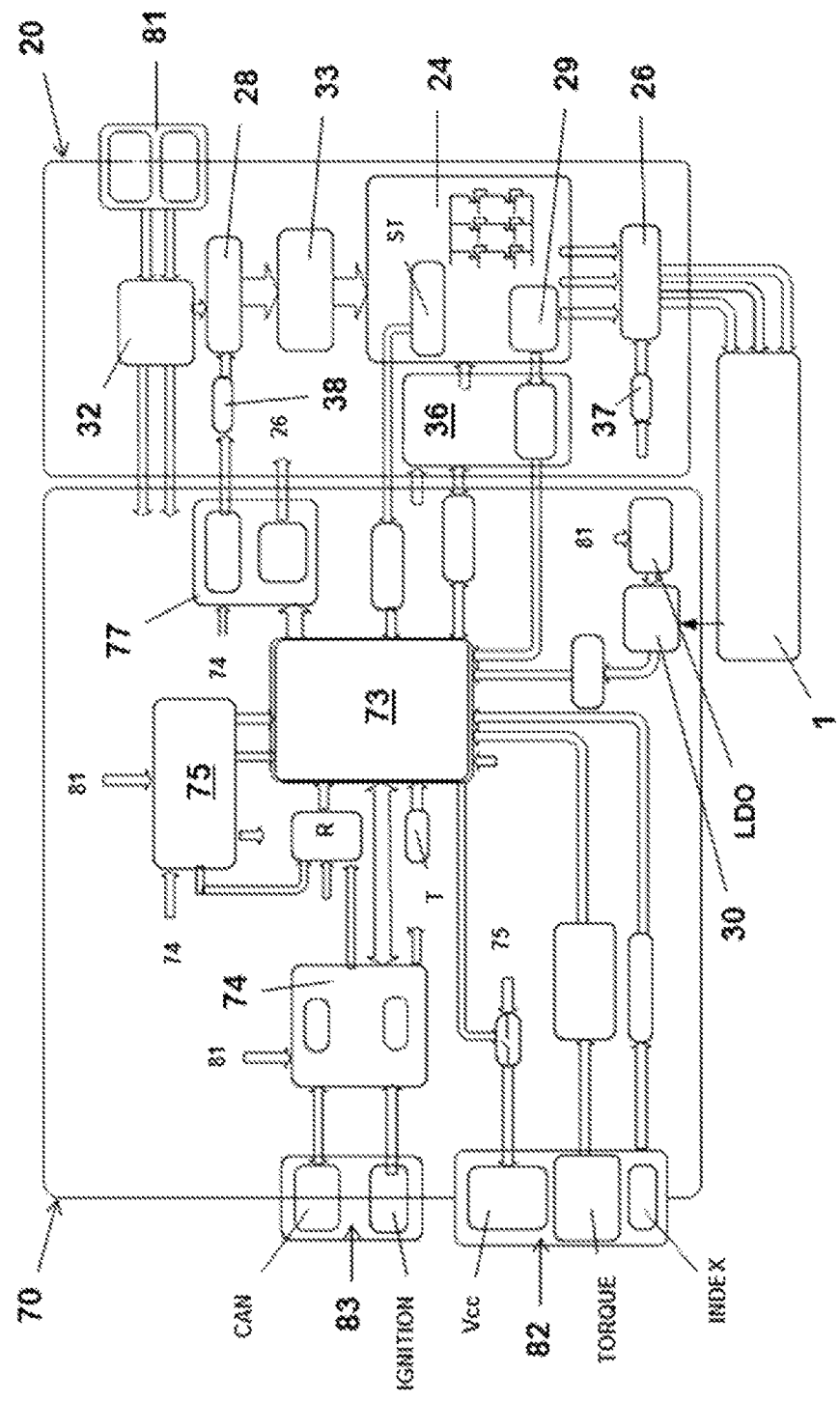
FIG. 17 shows a block diagram showing the communications of the main parts of the power board and the control board of the device of FIG. 1.

FIG. 17 shows a block diagram showing the communications of the main parts of the power board and control board of the device of FIG. 1. The control board 70 and power board 20, as well as the electric motor 1, are depicted in this block diagram. The torque signal inputs through the torque signal housing 82 of the connector 80 and the communication inputs through the communications housing 83 of the connector 80 are arranged in the control board 20. The torque signal housing 82 comprises three torque signal pins which allow having said torque signal in a doubly redundant manner and sending it to the microprocessor 73. It also comprises a pin as INDEX which allows sending a signal to the microprocessor 73, indicating the zero-crossing of the steering wheel. It also comprises four torque signal supply pins, two of which feed the torque sensor and the other two of which feed the INDEX, receiving a signal from the power source 75 of the control board 70 and from the microprocessor 73.

The communications housing 83 comprises a vehicle start signal input as IGNITION, said signal passing to the communications supervision device 74 SBC, and an input for the CAN communications bus, which is reciprocal between the communications housing 83 and the device 74.

The SBC device receives direct power from the battery BAT of the vehicle after being filtered by the choke coil 32 of the power board 20. There is reciprocal communication from the SBC device with the microprocessor 73, the SBC device performing monitoring functions, and it also communicates with the microprocessor 73 through a re-initializer R. The SBC device can also send secure signals to a control device 77 of the solid-state phase relays 26 and of the power supply relays 28.

In addition to the mentioned signals, the microprocessor 73 receives power from the power source 75 at 3V3 receiving a 5V analog signal as a reference, and a 5V monitoring signal for making sure that the torque sensor is correctly fed. The microprocessor 73 sends signals to the control device 77 and receives signals from the temperature sensor ST, from the shunts 29, from the magnetic angle sensor 30 that is fed from the battery BAT through a linear voltage regulator LDO, and from a timer T.

The power board 20 receives the power input from the battery of the vehicle through the external power supply housing 81 of the connector 80. The choke coil 32 which allows eliminating noises and interferences is powered from said housing 81, said power supply being transmitted from the choke coil 32 to the control board 70 through a connector between boards (not depicted in the drawings), and to the input of the power supply relays 28. These relays 28 comprising the semiconductor switching elements 27 receive excitation from a drive circuit 38, which in turn receives communication from the control device 77, and they allow passage of the flow of direct current DC towards the power filter 33. Said power filter 33 comprises a coil 34 and two capacitors 35 and allows filtering interferences.

This power filter 33 feeds the inverter 24 in which the temperature sensor ST is arranged and mainly the inverter circuit 24. This inverter circuit 24 comprising the semiconductor switching elements 23 allows converting direct current DC into three-phase alternating current AC powering the motor 1. The shunts 29 which allow measuring the flow of electric current towards the motor 1 are also arranged in this inverter 24, sending the signal indicating the level of current circulating through the shunts 20 to the microprocessor 73, such that the microprocessor makes decisions according to said level. The inverter 24 receives excitation from the drive circuit 36 which in turn receives signals from and sends them to the microprocessor 73.

Finally, and after the electric current passes through the inverter 24 and is converted to three-phase alternating current AC, the phase relays 26 comprising the semiconductor switching elements 25 are powered, and they receive excitation from the drive circuit 37, which in turn receives communication from the control device 77. The three-phase alternating current AC powers the three phases 4 (U, V, W) of the electric motor 1. The electric motor 1 comprising the shaft 6 has a magnet 9 generating a magnetic field in the position end 8, and the power board 20 comprises the magnetic sensor 30 which senses said magnetic field and thereby determines the position of the motor shaft 6. This intercommunication is depicted in the block diagram of FIG. 17 by means of an arrow heading away from the motor 1 towards the angle sensor 30.

What is claimed is:

1. An electric drive device for an electric power steering system, the electric drive device comprising:
   an electric motor including a motor case, a stator arranged inside a cavity of the motor case, a rotor arranged rotatable about an axis, and a motor shaft attached to the rotor, the motor shaft having a drive end, the motor case having a first end and a second end opposite the first end, the drive end of the motor shaft projecting in a first axial direction from the first end of the motor case,
   an electronic control unit that is configured to control the drive of the electric motor and being connected to and projecting in a second axial direction from the second end of the motor case, the second axial direction being opposite to the first axial direction, the electronic control unit comprising a heatsink coupled to the second end of the motor case, an outer periphery of the heatsink having one or more housings of a first configuration; and
   an electrical connector that is configured to connect the electronic control unit to electrical sources external to the electric drive device, the electrical connector being laterally coupled to the electric drive device and having one or more projections of a second configuration that respectively reside in the one or more housings of the heatsink, the first configuration and second configuration preventing a lateral movement of the connector in respect to the heatsink, the electronic control unit comprising a power board configured to supply a current to the electric motor, and a control board electrically connected to the power board which controls the drive of the electric motor through the power board, the power board being thermally coupled to the heat sink and disposed between the heatsink and the control board, the electronic control unit at least partially residing inside a cover that is coupled to the second end of the motor case, the electrical connector having a first area that at least partially resides inside the cover and a second area that resides outside the cover, the first area including a first terminal connected to the power board and a second terminal connected to the control board, the second area including a first connector electrically coupled to the first terminal and a second connector electrically coupled to the second terminal.

2. The electrical drive device according to claim 1, wherein the one or more projections project in a plane substantially perpendicular to the axis of the rotor.

3. The electrical drive device according to claim 1, wherein the first configuration comprises a lobe-shaped opening and the second configuration comprises a circular shape.

4. The electrical drive device according to claim 1, wherein the heatsink comprises a first surface facing the electric motor and a second surface facing away from the electric motor, the second surface having an outer vertical edge that extends only partially around the heatsink, the electrical connector having a vertical edge running along the area of intersection between the first area and second area, the vertical edge of the electrical connector and the outer vertical edge of the heatsink collectively forming a vertical edge that extends entirely around the heatsink.

5. The electrical drive device according to claim 4, wherein the electronic control unit at least partially resides inside a cover that is coupled to the second end of the motor case, the cover being assembled with the motor case with the vertical edge of the electrical connector and the outer vertical edge of the heatsink being housed inside the cover.

6. The electrical drive unit according to claim 1, wherein the electronic control unit at least partially resides inside a cover, the heatsink includes a peripheral region having a plurality of seats with through holes, the motor case includes at or near its second end a plurality of seats with through holes that coincide with the through holes of the heatsink, the cover including seats with through holes that coincide with the through holes of the heatsink, the seats of the heatsink being disposed between the seats of the motor case and the seats of the cover, the cover, heatsink and motor case being coupled together by fasteners that extend through the respective through holes.

7. An electric drive device for an electric power steering system, the electric drive device comprising:
   an electric motor including a motor case, a stator arranged inside a cavity of the motor case, a rotor arranged rotatable about an axis, and a motor shaft attached to the rotor, the motor shaft having a drive end, the motor case having a first end and a second end opposite the first end, the drive end of the motor shaft projecting in a first axial direction from the first end of the motor case,
   an electronic control unit that is configured to control the drive of the electric motor and being connected to and projecting in a second axial direction from the second end of the motor case, the second axial direction being opposite to the first axial direction, the electronic control unit comprising a heatsink coupled to the second end of the motor case, an outer periphery of the heatsink having one or more housings of a first configuration; and
   an electrical connector that is configured to connect the electronic control unit to electrical sources external to the electric drive device, the electrical connector being laterally coupled to the electric drive device and having one or more projections of a second configuration that respectively reside in the one or more housings of the heatsink, the first configuration and second configuration preventing a lateral movement of the connector in respect to the heatsink,
   wherein the electronic control unit comprises a power board configured to supply a current to the electric motor and the heatsink comprises first and second parts that are separable from one another, the first part having an outer surface that faces away from the motor and that is in abutment with at least a part of the power board, the second part abutting the first part and having a housing for receiving a position end of the motor shaft, the position end comprising a bearing assembly that is supported by a support structure that at least partially forms the housing.

8. An electric drive device according to claim 7, wherein the one or more housings in which the one or more projections of the electrical connector reside are located in the first part of the heatsink.

9. An electric drive device according to claim 7, wherein the second part of the heatsink acts as a closure cover of the motor case.

10. An electric drive device according to claim 1, wherein the electronic control unit comprises a power board configured to supply a current to the electric motor and the heatsink comprises first and second parts that are separable from one another, the first part having an outer surface that faces away from the motor and that is in abutment with at least a part of the power board, the second part surrounding the first part and having an outer surface that faces away from the motor and that is in abutment with at least a part of the power board, the second part having a housing for receiving a position end of the motor shaft, the position end comprising a bearing assembly that is supported by a support structure that at least partially forms the housing.

11. An electric drive device for an electric power steering system, the electric drive device comprising:
an electric motor including a motor case, a stator arranged inside a cavity of the motor case, a rotor arranged rotatable about an axis, and a motor shaft attached to the rotor, the motor shaft having a drive end, the motor case having a first end and a second end opposite the first end, the drive end of the motor shaft projecting in a first axial direction from the first end of the motor case,
an electronic control unit that at least partially resides inside a cover that is coupled to the second end of the motor case, the electronic control unit configured to control the drive of the electric motor and being connected to and projecting in a second axial direction from the second end of the motor case, the second axial direction being opposite to the first axial direction, the electronic control unit comprising a power board, a control board and a heatsink, the power board configured to supply a current to the electric motor, the control board electrically connected to the power board which controls the drive of the electric motor through the power board, the heatsink thermally coupled with the power board and having a first surface facing the electric motor and a second surface facing away from the electric motor, the second surface having an outer vertical edge that extends only partially around the heatsink; and
an electrical connector that is configured to connect the electronic control unit to electrical sources external to the electric drive device, the electrical connector having a first area that at least partially resides inside the cover and a second area that resides outside the cover, the first area including a first terminal connected to the power board and a second terminal connected to the control board, the second area including a first connector electrically coupled to the first terminal and a second connector electrically coupled to the second terminal, the electrical connector being laterally attached to the electric drive device and having a vertical edge running along the area of intersection between the first area and second area, the vertical edge of the electrical connector and the outer vertical edge of the heatsink collectively forming a vertical edge that extends entirely around the heatsink.

12. The electric drive device according to claim 11, wherein the cover is assembled with the motor case with the vertical edge of the electrical connector and the outer vertical edge of the heatsink being housed inside the cover.

13. An electric drive device according to claim 11, wherein the heatsink comprises first and second parts that are separable from one another, the first part having an outer surface that faces away from the electric motor and that is in abutment with at least a part of the power board, the second part abutting the first part and having a housing for receiving a position end of the motor shaft, the position end comprising a bearing assembly that is supported by a support structure that at least partially forms the housing.

14. An electric drive device according to claim 13, wherein the second part of the heatsink acts as a closure cover of the motor case.

15. An electric drive device according to claim 11, wherein the heatsink comprises first and second parts that are separable from one another, the first part having an outer surface that faces away from the motor and that is in abutment with at least a part of the power board, the second part surrounding the first part and having an outer surface that faces away from the motor and that is in abutment with at least a part of the power board, the second part having a housing for receiving a position end of the motor shaft, the position end comprising a bearing assembly that is supported by a support structure that at least partially forms the housing.

16. An electric drive device for an electric power steering system, the electric drive device comprising:
an electric motor including a motor case, a stator arranged inside a cavity of the motor case, a rotor arranged rotatable about an axis, and a motor shaft attached to the rotor, the motor shaft having a drive end, the motor case having a first end and a second end opposite the first end, the drive end of the motor shaft projecting in a first axial direction from the first end of the motor case,
an electronic control unit that is configured to control the drive of the electric motor and being connected to and projecting in a second axial direction from the second end of the motor case, the second axial direction being opposite to the first axial direction, the electric control unit comprising a heatsink coupled to the second end of the motor case,
an electrical connector that is configured to connect the electronic control unit to electrical sources external to the electric drive device, the electrical connector being laterally attached to the electric drive device,
wherein the electronic control unit comprises a power board configured to supply a current to the electric motor and the heatsink comprises first and second parts that are separable from one another, the first part having an outer surface that faces away from the electric motor and that is in abutment with at least a part of the power board, the second part abutting the first part and having a housing for receiving a position end of the motor shaft, the position end comprising a bearing assembly that is supported by a support structure that at least partially forms the housing.

17. An electric drive device according to claim 16, wherein the second part of the heatsink acts as a closure cover of the motor case.

18. An electric drive device according to claim 16, wherein an outer periphery of the first part of the heatsink comprises one or more housings of a first configuration and the electrical connector has one or more projections of a second configuration that respectively reside in the one or more housings of the first part of the heatsink, the first configuration and second configuration preventing a lateral movement of the connector in respect to the first part of the heatsink.

\* \* \* \* \*